US012155255B2

(12) United States Patent
Park et al.

(10) Patent No.: US 12,155,255 B2
(45) Date of Patent: Nov. 26, 2024

(54) POWER SUPPLY DEVICE OF SYSTEM

(71) Applicant: HL KLEMOVE CORP, Incheon (KR)

(72) Inventors: Jong Gyu Park, Yongin-si (KR); Han Yeol Yu, Suwon-si (KR)

(73) Assignee: HL KLEMOVE CORP., Incheon (KR)

(*) Notice: Subject to any disclaimer, the term of this patent is extended or adjusted under 35 U.S.C. 154(b) by 166 days.

(21) Appl. No.: 17/572,406

(22) Filed: Jan. 10, 2022

(65) Prior Publication Data
US 2022/0131399 A1  Apr. 28, 2022

Related U.S. Application Data

(63) Continuation of application No. PCT/KR2020/010058, filed on Jul. 30, 2020.

(30) Foreign Application Priority Data

Aug. 22, 2019  (KR) .................. 10-2019-0102779

(51) Int. Cl.
H02J 7/00 (2006.01)

(52) U.S. Cl.
CPC ....... *H02J 7/00712* (2020.01); *H02J 7/00711* (2020.01)

(58) Field of Classification Search
CPC .................. H02J 7/00712; H02J 7/00711
See application file for complete search history.

(56) References Cited

U.S. PATENT DOCUMENTS 7,321,815 B2 * 1/2008 Homma ............. B60R 16/0232
                                                        348/E5.127
2007/0288102 A1  12/2007 Korzin
2015/0210167 A1 * 7/2015 Suekane ................ B60L 3/04
                                                        307/10.1

FOREIGN PATENT DOCUMENTS

JP   2006-336521 A     12/2006
JP   2019-64531 A       4/2019
KR   20-1995-0011362 U  5/1995
KR   10-2014-0112733 A  9/2014
KR   10-2001509 B1      7/2019

OTHER PUBLICATIONS

International Search Report issued on Oct. 27, 2020, corresponding to International Patent Application No. PCT/KR2020/010058.
Written Opinion issued on Oct. 27, 2020, corresponding to International Patent Application No. PCT/KR2020/010058.
Korean Notice of Allowance issued on Dec. 21, 2023, in connected with Korean Patent Application No. 10-2019-0102779; with English machine translation (3 pages).

* cited by examiner

Primary Examiner — Daniel Cavallari
(74) Attorney, Agent, or Firm — Hauptman Ham, LLP

(57) ABSTRACT

The present disclosure relates to a power supply device of a system contained inside a vehicle. Specifically, the present disclosure relates to a technique for implementing a switching function in place of a switching circuit which limits the power of a battery. The power supply device, according to the present disclosure, determines the start state of the system using a change in the state of a start signal of the vehicle, and supplies power or stops the supply of power according to the determined start state.

9 Claims, 20 Drawing Sheets

FIG.4
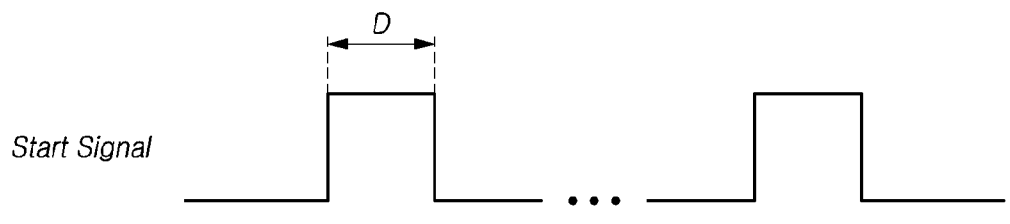
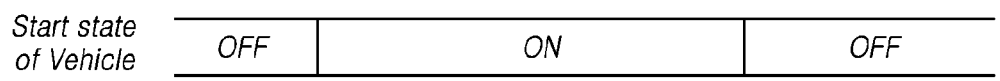
< a >
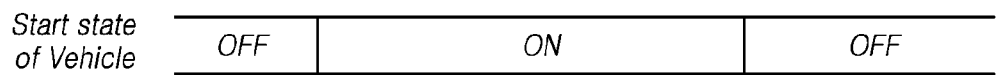
< b >

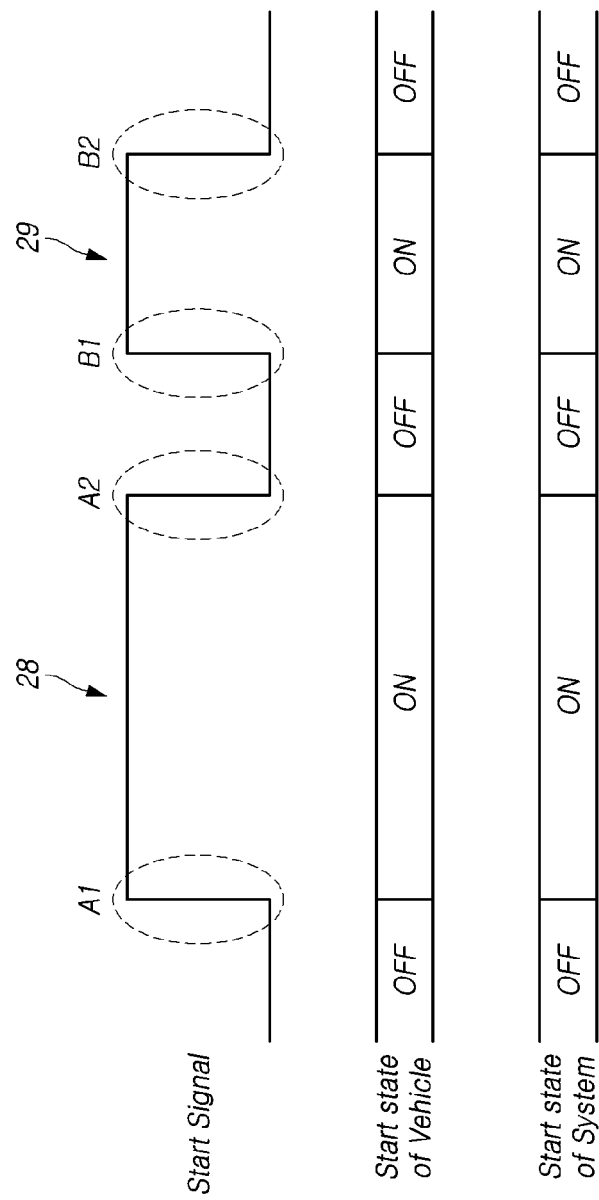

POWER SUPPLY DEVICE OF SYSTEM

CROSS-REFERENCE TO RELATED APPLICATIONS

This application is a Continuation of PCT/KR2020/010058 filed on Jul. 30, 2020, which is based on and claims priority to Korean Patent Application No. 10-2019-0102779 filed on Aug. 22, 2019, with the Korean Intellectual Property Office, the disclosure of which are incorporated herein by reference in their entireties.

TECHNICAL FILED

The present disclosure relates to a power supply device of a system contained inside a vehicle, specifically, relates to a technology for implementing a switching function in place of a switching circuit for limiting battery power.

BACKGROUND ART

Electronic components included in a vehicle operate by using power from a battery included in the vehicle. Among these electronic components, in the case of display devices and lamps, they are turned off together when the vehicle start is turned off in order to prevent the battery from being discharged. In the case of a watch or a device controlling a vehicle, it can always operate using dark current even when the vehicle start is turned off.

In order for the device to always operate using dark current even when the vehicle start is turned off, there may be generally used a switch circuit composed of physical elements such as FETs and BJTs. However, since such a switch circuit occupies a large area on a substrate such as a PCB, it is difficult to miniaturize the device.

DETAILED DESCRIPTION OF INVENTION

Technical Problem

In this background, an object of the present disclosure is to provide a power supply device capable of miniaturizing a system by performing logic instead of switching elements.

In addition, an object of the present disclosure is to provide a power supply device capable of maximizing vehicle safety by continuously operating the system even if the vehicle start or vehicle ignition is turned off after the system is determined to be turned on.

Technical Solution

In order to solve the above problems, in one aspect, the present disclosure provides a power supply device of a system capable of operating even when a vehicle start is turned off including a signal receiving unit for receiving a start signal of the vehicle, a communication unit for performing internal communication with a controller of the system, an on/off determination unit configured to determine a start state of the system based on at least one of a state change of the received start signal and whether of receiving a communication signal output from the controller of the system, and a power output unit for supplying power in case of a system-on, and stopping the supply of the power in case of a system-off.

In another aspect, the present disclosure provides a power supply device of a system for operating depending on a start state of a vehicle including a signal receiving unit for receiving a start signal of the vehicle, an on/off determination unit configured to determine, if the start signal is received, a start state of the system based on a change in a state of the start signal, and a power output unit for supplying power in case of a system-on, and stopping the supply of the power in case of a system-off.

Advantageous Effects

According to an embodiment of the present disclosure, it is possible to provide a power supply device capable of miniaturizing a system by performing logic in place of the switching element.

In addition, according to an embodiment of the present disclosure, it is possible to provide a power supply device capable of maximizing vehicle safety by continuously operating the system even if the vehicle start or vehicle ignition is turned off after the system is determined to be turned on.

BRIEF DESCRIPTION OF DRAWINGS

FIG. 4 is a diagram illustrating an example of a start signal according to the present disclosure.

FIG. 20 is a diagram illustrating an embodiment in which the second power supply device determines a start state of the system in the case that the start signal is a non-pulse signal.

MODE FOR DISCLOSURE

Hereinafter, it will be described embodiments of the present disclosure in detail with reference to exemplary drawings. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element "is connected to", "is coupled to", or "contacts" the other element, it should be interpreted that, not only can the element is directly connected to, directly coupled to, or directly contact the other element, but another element can also be interposed between the element and the other element.

Figure 1:
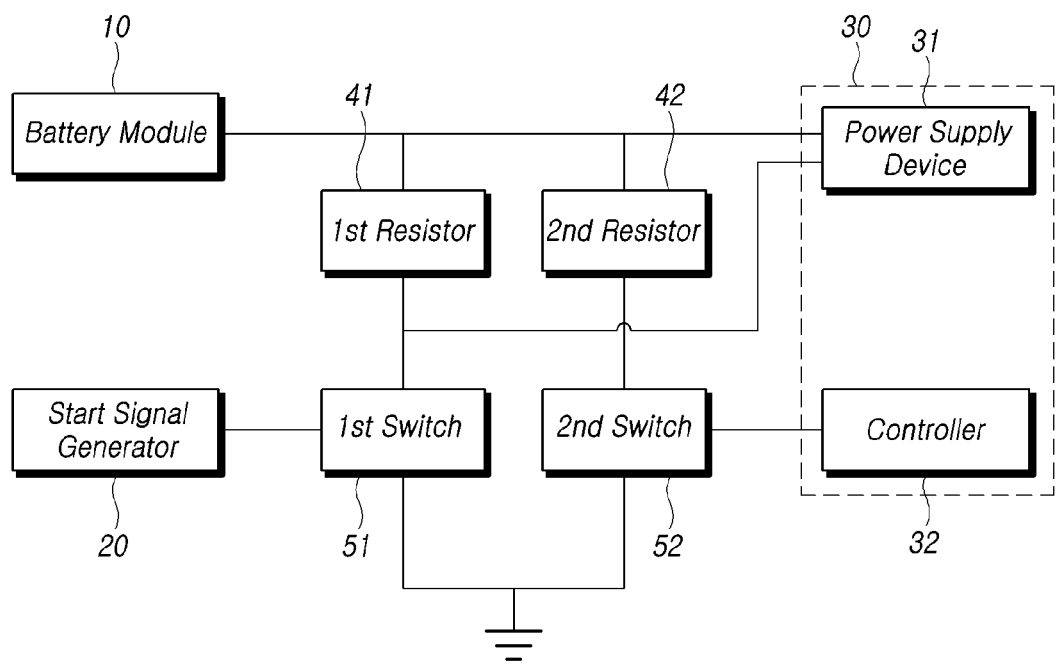
FIG. 1 is a diagram schematically illustrating an embodiment in which battery power and a start signal are supplied to a system according to the present disclosure.
Figure 2:
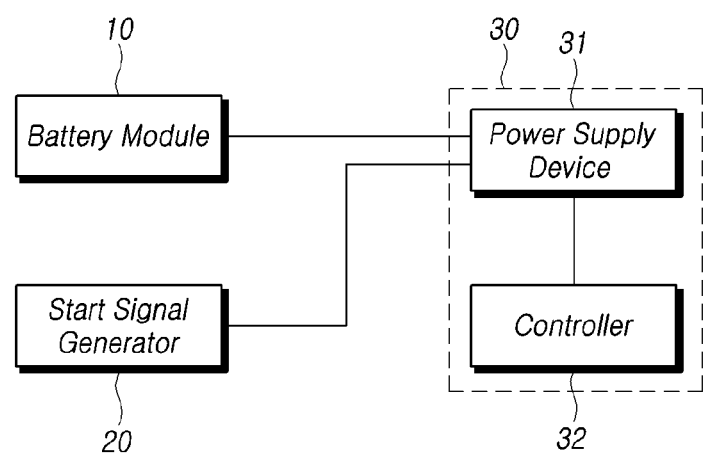
FIG. 2 is a diagram schematically illustrating another embodiment in which battery power and a start signal are supplied to a system according to the present disclosure.

FIG. 1 is a diagram schematically illustrating an embodiment in which battery power and a start signal are supplied to a system 30 according to the present disclosure, and FIG. 2 is a diagram schematically illustrating another embodiment in which battery power and a start signal are supplied to a system 30 according to the present disclosure.

Referring to FIG. 1, a battery module 10, a start signal generator 20, a system 30, resistors 41 and 42, and switches 51 and 52 may be included inside the vehicle (not shown) according to the present disclosure.

The battery module 10 may supply power (voltage or current) to the system 30. The battery module 10 may include an energy storage unit, a diode for preventing back electromotive force from the system 30 to the battery module 10, and a power stabilization circuit implemented with an inductor, a capacitor, etc. to stabilize power.

The start signal generator 20 may generate a start signal of the vehicle and transmit the generated start signal to the system 30. Specifically, if a user such as a vehicle occupant inputs a start button disposed in the vehicle, the start signal generator 20 may generate the start signal in response to the user's input.

In this case, the pattern or type of the start signal may exist in various ways according to the design process. A specific form of the start signal will be described later with reference to FIG. 4.

The system 30 may receive power from the battery module 10 to detect the surroundings of the vehicle, detect driving information such as vehicle speed and steering angle, control the vehicle, or provide convenience functions to passengers.

For example, the system 30 may be an object detection system corresponding to a sensor such as a camera, radar, lidar, etc., may be a display system corresponding to a display device such as display panel, a digital instrument panel, or may be a vehicle control system for controlling driving and braking of a vehicle, however, is not limited thereto.

Such a system 30 may include a power supply device 31 and a controller 32, and the like.

The power supply device 31 may receive power from the battery module 10 and supply appropriate driving power to the controller 32 and other components included in the system 30. The power supply device 31 may be implemented as an integrated circuit (IC) chip.

The controller 32 may receive power from the power supply device 31 and may process data to execute a command or to perform a function of the system 30. The controller 32 may mean, for example, a micro controller unit (MCU), a digital signal processing or digital signal processor (DSP), a field-programmable logic array (FPGA), or the like.

Meanwhile, in consideration of the energy efficiency of the battery module 10 and the stability of the vehicle, when the ignition or start of the vehicle is turned off, the system 30 may be also turned off, and when the ignition or start of the vehicle is turned on, the system 30 may also be turned on. Alternatively, the system 30 may be operable using the dark current of the battery module 10 even when the ignition or start of the vehicle is turned off.

For example, the system 30 which operates depending on the start state of the vehicle may be a display system, and the system 30 capable of operating even when the start of the vehicle is turned off may be an object detection system such as a radar. However, the present invention is not limited thereto.

In order for the system 30 to operate using the dark current of the battery module 10 even when the vehicle ignition is turned off or to operate depending on the start state of the vehicle, the system 30 may monitor a start signal through the resistors 41 and 42, the switches 51 and 52 and the like, and determine the start state of the system 30.

For example, the power supply device 31 included in the system 30 may be connected to the battery module 10, one end of a first resistor 41, and one end of a second resistor 42 through a power supply pin, and may be connected to the other end of the first resistor 41 and one end of a first switch 51 through an enable pin. In addition, the controller 32 included in the system 30 may be connected to a second switch 52. The system 30 may monitor a start signal by a switching operation of the first switch 51 and the second switch 52.

The system 30 may operate to limit the power of the battery module 10 by monitoring the start signal using the resistors 41 and 42, the switches 51 and 52, and the like.

Meanwhile, the above-described resistors 41 and 42 and switches 51 and 52 may occupy a large area on a substrate such as a PCB. In order to implement the miniaturized system 30, a switch circuit including resistors 41 and 42, and switches 51 and 52 may be implemented in a logic aspect of a signal on the system 30.

Referring to FIG. 2, instead of the switch circuit including resistors 41 and 42, switches 51 and 52, etc. shown in FIG. 1, the inside of the vehicle (not shown) according to the present disclosure may include a bus to enable internal communication between the power supply device 31 and the controller 32.

In this case, the bus disposed between the power supply device 31 and the controller 32 may be a serial peripheral interface (SPI), an inter-integrated circuit (I2C), or the like, however, is not limited thereto.

The power supply device 31 included in the system 30 may directly recognize the pattern of the start signal and the state change of the start signal, and may receive a response signal from the controller 32 by performing internal communication with the controller 32 to determine the start state of the system 30.

For example, the system 30, which is operable even when the vehicle ignition is turned off, may receive a start signal using an enable pin, and may determine the start state of the system 30 based on at least one of a state change of the start signal and a communication signal output from the controller 32.

As another example, the system 30 operating depending on the start state of the vehicle may receive the start signal using an enable pin, and may determine the start state of the system 30 based on a change in the state of the start signal.

Hereinafter, it will be described the power supply device 31 of the system 30 which can operate even when the vehicle ignition is turned off in detail.

Figure 3:
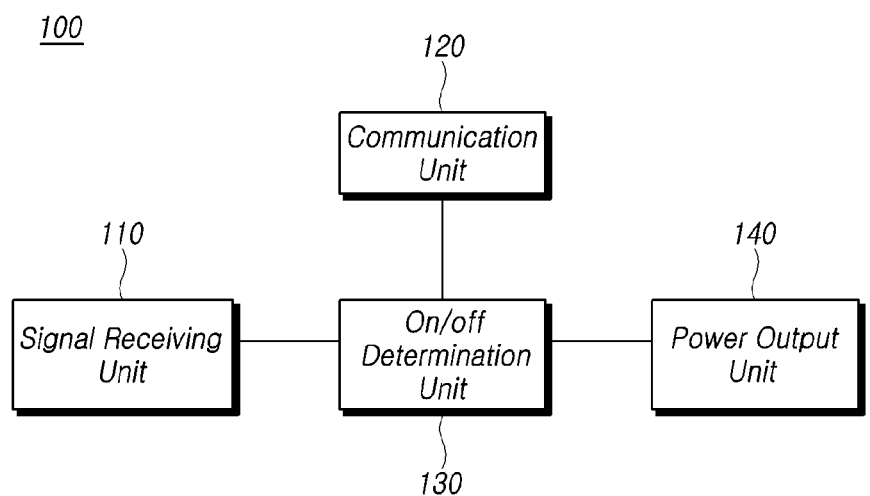
FIG. 3 is a block diagram for explaining a first power supply device according to the present disclosure.

FIG. 3 is a block diagram for explaining a first power supply device 100 according to the present disclosure.

Referring to FIG. 3, a first power supply device 100 according to the present disclosure may include a signal receiving unit 110, a communication unit 120, an on/off determination unit 130, a power output unit 140, and the like.

The signal receiving unit 110 may receive a start signal of the vehicle.

The communication unit 120 may perform internal communication with the controller 32 of the system 30. Referring to FIG. 2, for example, the communication unit 120 may receive a communication signal from the controller 32 through an SPI, I2C bus, or the like.

Here, the communication signal may mean, for example, a response signal indicating that booting is complete, an off request signal requesting the system 30 to be off, or a non-operational signal indicating that the state of the controller 32 is abnormal or that the controller 32 is malfunctioning. However, the present invention is not limited thereto.

The on/off determination unit 130 may determine the start state of the system 30 based on at least one of a state change of the received start signal and whether a communication signal output from the controller 32 is received.

For example, the on/off determination unit 130 may determine from a system-off to a system-on only based on the state change of the start signal. Alternatively the on/off determination unit 130 may finally confirmed the system-on by receiving the communication signal from the controller 32 after preliminarily determining the system-on by the state change of the start signal. However, the present invention is not limited thereto.

Here, the on/off determination unit 130 may distinguish a type of the start signal. A detailed description thereof will be described later with reference to FIG. 4.

The power output unit 140 may supply power when the system is on, and stop the supply of power when the system is off. As a specific example, if it is determined that the system 30 is in a state of a system-on, the power output unit 140 converts the power supplied from the battery module 10 to the power required by the controller 32, and supplies the converted power to the controller 32, and if the system 30 is determined to be in a state of system-off, the power output unit 140 stops the power supplied to the controller 32.

As described above, the first power supply device 100 according to the present disclosure provides the effect of miniaturizing the system 30 by performing logic instead of the switching element.

Meanwhile, since the first power supply device 100 according to the present disclosure may determine the system-on or the system-off by using the change in a state of the start signal, it is necessary to specify the pattern of the start signal.

Hereinafter, the start signal will be described in detail.

FIG. 4 is a diagram illustrating an example of a start signal according to the present disclosure.

Referring to FIG. 4 <a>, the start signal may be a pulse signal input by a user. That is, the start signal may be a pulse signal that may be generated whenever a user in the vehicle presses a start button or an ignition button.

Here, the pulse signal may refer to a signal which is switched from a first state (e.g., low state) to a second state (e.g., high state), and the switched second state is maintained for a specific period of time and then switched back to the first state.

In this case, a pulse width D of the pulse signal may correspond to a period in which a specific state is maintained. For example, the pulse width D of the pulse signal corresponds to a period in which the second state is maintained.

Here, as described above, the first state is, for example, a low state, and the second state is, for example, a high state, however is not limited thereto. If the start signal is inverted compared to the above-described example, the first state may be, for example, a high state, and the second state may be a low state, and it is obvious that the contents of the present disclosure may also be applied in this case. Hereinafter, the present disclosure will be described on the assumption that the first state is, for example, a low state, and the second state is a high state, for convenience of description in the case where there is no particular limitation.

A start state of the vehicle may be changed whenever a start signal, which is a pulse signal, is generated. Referring to FIG. 4 <a>, for example, in the case that the start signal is a pulse signal, if the start signal is generated in a state in which the vehicle is initially turned off (OFF), the vehicle is started. Conversely, if a start signal is generated in a state in which the vehicle ignition is turned on (ON), the vehicle ignition is turned off.

Meanwhile, referring to FIG. 4 <b>, the start signal may be a non-pulse signal like a physical switch. That is, the start signal may be a non-pulse signal in which if the start signal is input by the user in the first state (e.g., low state), the start signal is maintained in the second state (e.g., high state) and if the start is input by the user in the second state the start signal is maintained in the first state.

Referring to FIG. 4 <b>, for example, in the case that the start signal is a non-pulse signal, if the start signal is switched from the first state to the second state, the vehicle is started. Conversely, if the start signal is switched from the second state to the first state, the vehicle ignition is turned off.

Meanwhile, a type of the start signal may be classified by the on/off determination unit 130. For example, the on/off determination unit 130 may compare the maintenance period with a preset reference period by measuring a maintenance period in which the second state is maintained if the start signal of the first state is switched to the second state.

If the maintenance period is less than the reference period, the on/off determination unit 130 may determine that the start signal is a non-pulse signal, and if the maintenance period is greater than the reference period, the on/off determination unit 130 may determine that the start signal is a pulse signal.

Here, if the second state of the start signal is switched to the first state, the on/off determination unit 130 may initialize the measured maintenance period.

Figure 5:
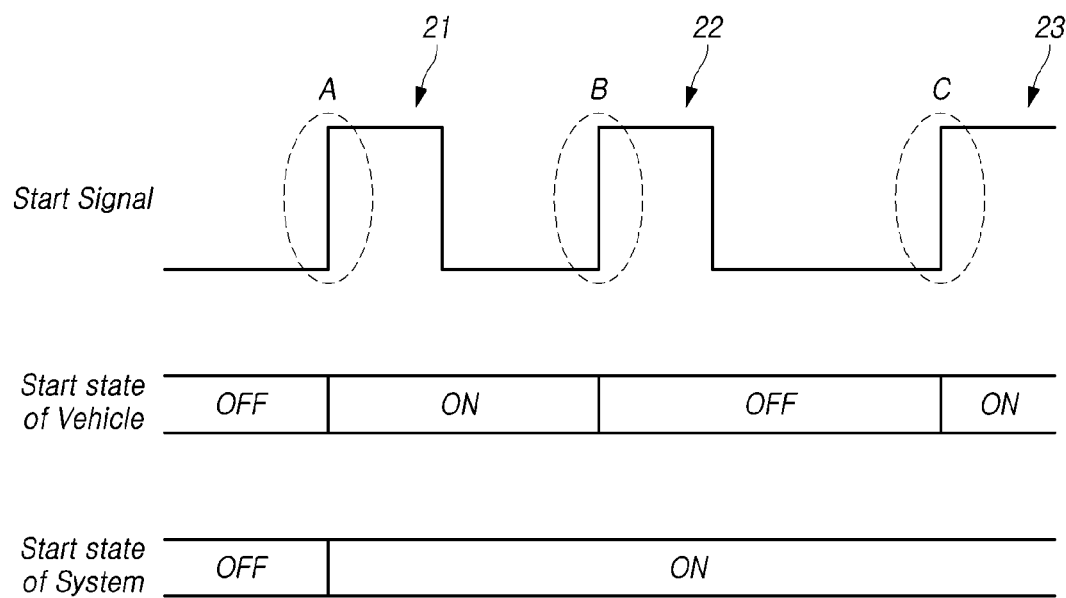
FIG. 5 is a diagram illustrating a first embodiment in which the first power supply device determines system-on in the case that the start signal is a pulse signal.

FIG. 5 is a diagram illustrating a first embodiment in which the first power supply device 100 determines system-on in the case that the start signal is a pulse signal.

Referring to FIG. 5, the on/off determination unit 130 may determine whether of a system-on based on whether the start signal is switched from the first state to the second state in a system-off state.

For example, in the case that the start signal is a pulse signal, if a first start signal 21 is generated in a state of the system-off, the state of the first start signal 21 is switched from the first state to the second state and then is switched back from the second state to the first state. In this case, the on/off determination unit 130 may determine that the system is the system-on state from a time point or period A when the first start signal 21 is switched from the first state to the second state.

After the system 30 is determined to be the system-on, the system 30 may be continuously maintained in the system-on state even if the ignition of the vehicle is turned off by generating a start signal. That is, the on/off determination unit 130 may maintain the system-on state even if the start signal is received after determining the system-on.

For example, even if a second start signal 22 is received after the first start signal 21 is generated, the on/off determination unit 130 does not determine the system-off at a time point or period B when the second start signal 22 is switched from the first state to the second state, but continuously maintains the system-on.

As another example, even if a third start signal 23 is received after the second start signal 22 is generated, the on/off determination unit 130 continuously maintains the system-on even at the time point or period C when the first state is switched to the second state.

As described above, the first power supply device 100 according to the present disclosure may provide the effect of maximizing vehicle safety by continuously operating the system 30 even if the vehicle ignition is turned off after the system 30 is determined to be the system-on.

Meanwhile, in addition to the normal start signal, a spark generated by noise, disturbance, etc. may also have the same form as the pulse signal, and this spark may also be input to the signal receiving unit 110. In this case, it is required to distinguish between the noise signal and the start signal.

Figure 6:
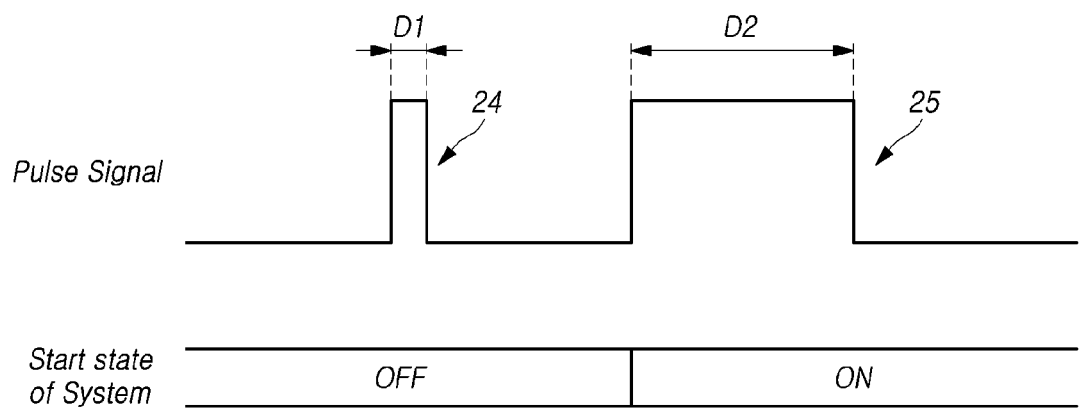
FIG. 6 is a diagram illustrating a second embodiment in which the first power supply device determines system-on in the case that the start signal is a pulse signal.

FIG. 6 is a diagram illustrating a second embodiment in which the first power supply device 100 determines system-on in the case that the start signal is a pulse signal.

Referring to FIG. 6, the on/off determination unit 130 may compare a pulse width with a preset reference width, and determine whether of the system-on according to the comparison result.

Here, the reference width may be a value set to prevent a spark-based signal. In general, since the pulse width of the spark-based signal is 200 μs, the reference width may be set to a value of 200 μs or more. However, the present invention is not limited thereto, and may be changed through communication with the controller 32.

In addition, if the pulse width of the start signal is always constant whenever a start signal designed as a pulse signal is generated, the reference width may be set equal to the start signal, however, is not limited thereto.

For example, in the case that a noise signal is a first pulse signal 24 in which the period during which the second state is maintained is a first pulse width D1, the on/off determination unit 130 may determine or maintain the system-off if the first pulse width D1 is smaller than the reference width.

For another example, in the case that the start signal is a second pulse signal 25 having a second pulse width for a period in which the second state is maintained, the on/off determination unit 130 may determine that the system is the system-on state if the second pulse width is greater than or equal to the preset reference width.

As described above, the first power supply device 100 according to the present disclosure provides an effect of accurately determining a start state of the system 30 by clearly distinguishing the noise signal and the start signal.

Meanwhile, even if the system 30 is determined to be the system-on state by using the pulse width and the state change of the start signal of a type of the pulse signal, the controller 32 may not operate normally. In this case, it is required to check whether the controller 32 is in a state capable of performing a normal function.

Figure 7:
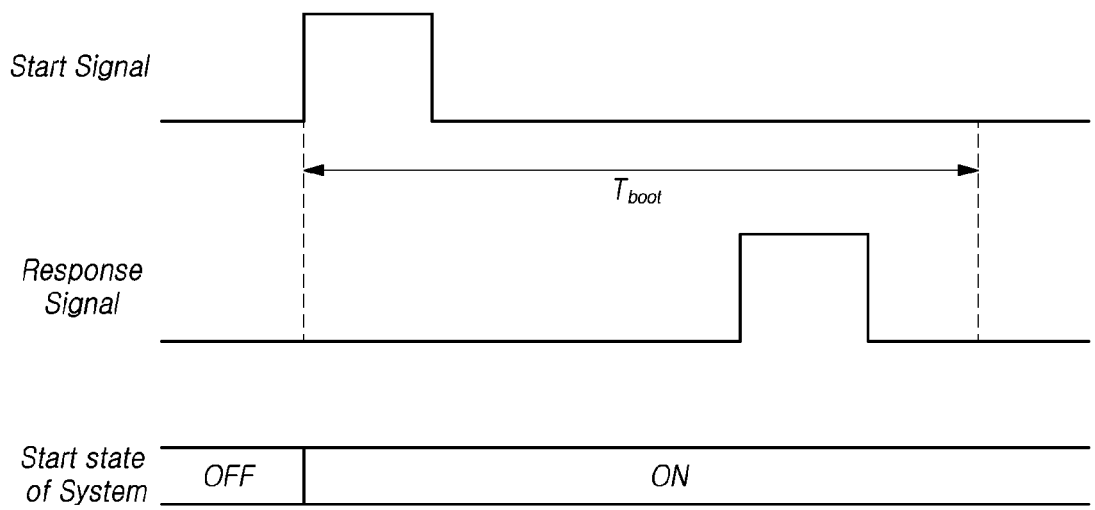
FIGS. 7 and 8 are diagrams illustrating a third embodiment in which the first power supply device determines system-on in the case that the start signal is a pulse signal.
Figure 8:
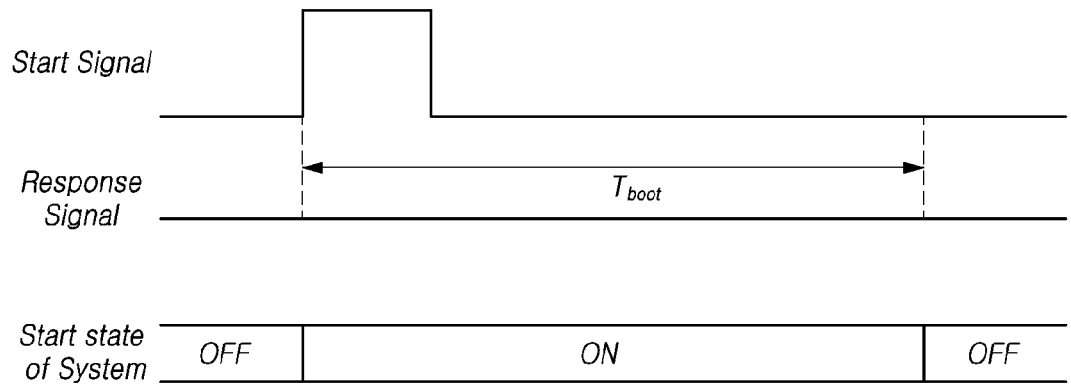

FIGS. 7 and 8 are diagrams illustrating a third embodiment in which the first power supply device 100 determines system-on in the case that the start signal is a pulse signal.

Referring to FIGS. 7 and 8, the on/off determination unit 130 may determine whether of the system-on based on whether the start signal is switched from a first state to a second state in a system-off state and whether of receiving a response signal output from the controller 32 at a preset booting response time $T_{boot}$ after the start signal is switched from the first state to the second state.

For example, the on/off determination unit 130 determines that the system is the system-on state if the start signal as a pulse signal is switched from the first state to the second state in the system-off state and the pulse width is equal to or greater than the reference value. Then, if a response signal is received within the booting response time $T_{boot}$ from the time point when the start signal is switched from the first state to the second state, the on/off determination unit 130 finally determines the system-on.

Here, the booting response time $T_{boot}$ may mean a time during which the on/off determination unit 130 temporarily waits to receive a response signal from the controller 32. The booting response time $T_{boot}$ may be determined from, for example, a time point when a start signal, which is a pulse signal, is switched from the first state to the second state, but is not limited thereto.

Here, the response signal may mean a signal including information about a state in which the controller 32 can normally perform a function.

Meanwhile, referring to FIG. 8, if a response signal is not received within the booting response time $T_{boot}$ from the time point when the start signal is switched from the first state to the second state, the on/off determination unit 130 may determine that the system in the system-off state.

For example, the on/off determination unit 130 determines from the system-off to the system-on if the start signal is switched from the first state to the second state, but if a response signal is not received in the system-on state, there may be determined from the system-on to the system-off.

Here, the time point at which the on/off determination unit 130 determines from system-on to system-off may preferably mean a time when the booting response time Tboot has elapsed, but it may be changed according to the design process or the controller 32.

For example, in the case that the start signal is a pulse signal, the on/off determination unit 130 determines from system-on to system-off if a response signal is not received after the booting response time has elapsed.

As described above, the first power supply device 100 according to the present disclosure can provide the effect of more accurately determining the start state of the system 30 by determining whether of the system-on by using whether a response signal output from the controller 32 is received.

Meanwhile, after the system 30 is determined to be the system-on by the first power supply device 100 according to the present disclosure, the system 30 continues to be the system-on state even if the ignition of the vehicle is turned off by generating of a start signal. Therefore, in some cases, there may be difficult for the on/off determining unit 130 to determine the system-off only by the change in the state of the start signal.

In this case, it is necessary to determine the case in which the system 30 is off due to an unpredictable error of the system 30 or a failure of the controller 32, or the like. Hereinafter, it will be described a method in which the first power supply device 100 according to the present disclosure determines the system-off in detail.

Figure 9:
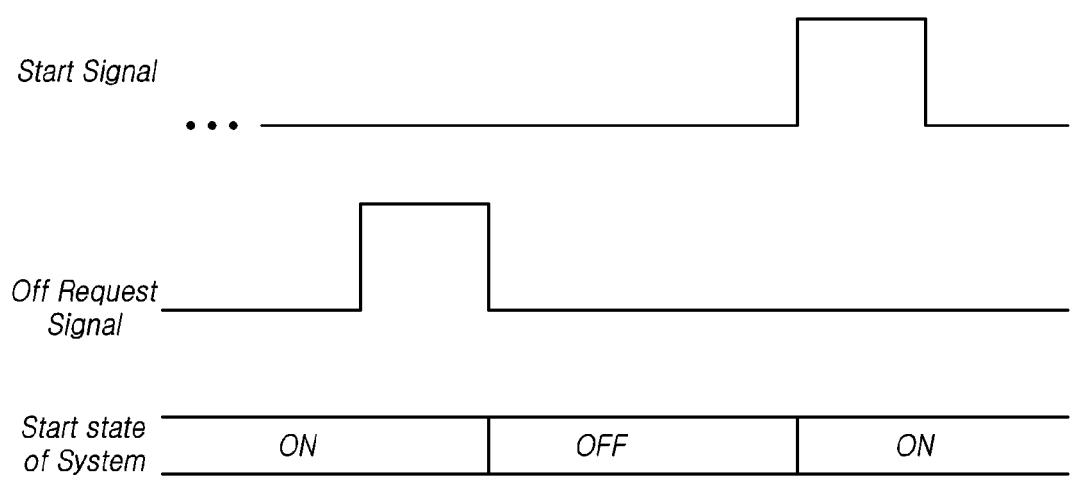
FIG. 9 is a diagram illustrating a first embodiment in which the first power supply device determines the system-off in the case that the start signal is a pulse signal.
Figure 10:
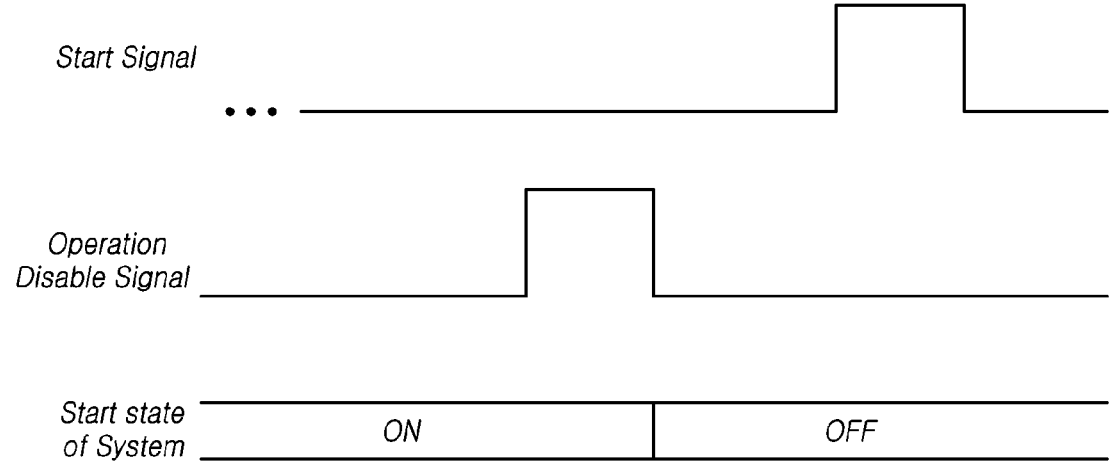
FIG. 10 is a diagram illustrating a second embodiment in which the first power supply device determines the system-off in the case that the start signal is a pulse signal.

FIG. 9 is a diagram illustrating a first embodiment in which the first power supply device 100 determines the system-off in the case that the start signal is a pulse signal, and FIG. 10 is a diagram illustrating a second embodiment in which the first power supply device 100 determines the system-off in the case that the start signal is a pulse signal.

Referring to FIG. 9, in the case that it is determined that the controller 32 cannot temporarily perform the function, the controller 32 may request the power supply device to turn off the system for resetting the system 30.

In this case, the on/off determination unit 130 may determine from system-on to system-off if an off request signal output from the controller 32 is received in the system-on state regardless of the start state of the vehicle, that is, the state change of the start signal.

For example, if the off request signal is received in the system-on state, the on/off determination unit 130 determines from the system-on to the system-off when the reception of the off request signal ends.

Here, the off request signal may mean a signal that the controller 32 requests to turn off the system.

If the start signal is received again after the system-off, the on/off determination unit 130 may determine whether of the system-on in the same manner as described above with reference to FIGS. 5 to 8.

Meanwhile, referring to FIG. 10, in the case that the failure of the controller 32 cannot be solved even by resetting the system 30, the controller 32 may transmit an operation disable signal to the power supply device.

In this case, the on/off determination unit 130 may determine whether the operation disable signal output by the controller 32 in the system-on state is received.

If the operation disable signal is received, the on/off determination unit 130 may determine from the system-on to the system-off.

In this case, even if the start signal is received after the system-off is determined, the on/off determination unit 130 may maintain the system-off state.

According to the present disclosure, the first power supply device 100 according to the present disclosure may provide the effect of miniaturizing the system 30 by performing logic in place of the switching element.

Hereinafter, it will be described an embodiment in which the first power supply device 100 determines the state of the system 30 in detail in the case that the start signal is a non-pulse signal.

Figure 11:
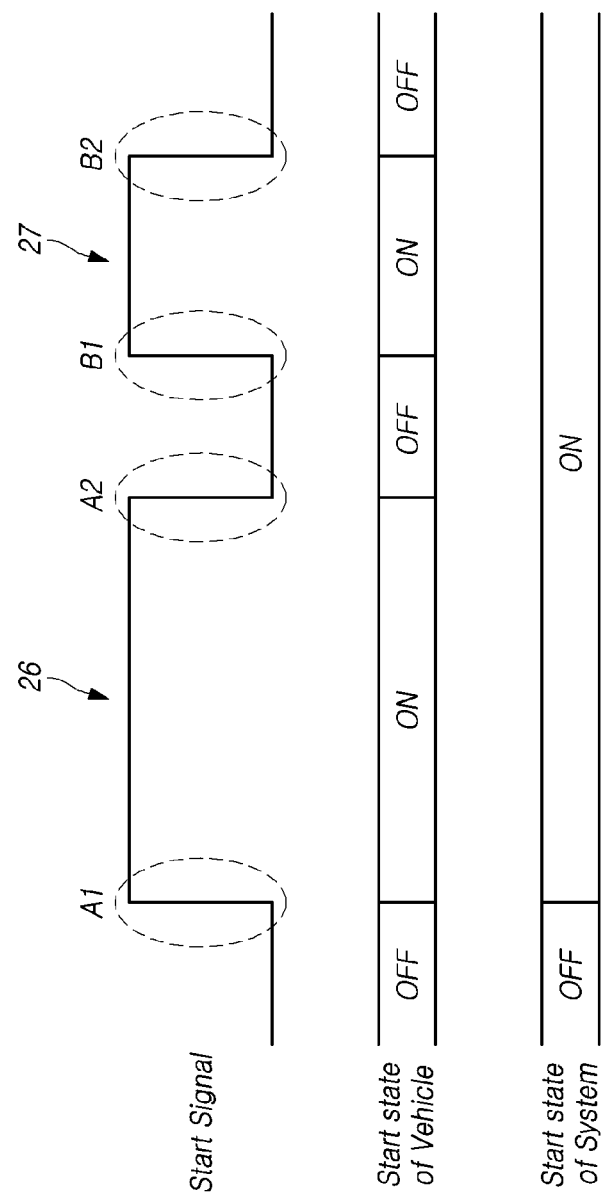
FIG. 11 is a diagram illustrating a first embodiment in which the first power supply device determines system-on in the case that the start signal is a non-pulse signal.

FIG. 11 is a diagram illustrating a first embodiment in which the first power supply device 100 determines system-on in the case that the start signal is a non-pulse signal.

Referring to FIG. 11, as described above, in the case of a non-pulse type start signal, if the state of the start signal is a first state (e.g., low), the vehicle start is turned off (OFF), and if the state of the start signal is the second state (e.g., high), the vehicle start is turned on (ON).

For a specific example, the vehicle start is turned on at a time point or a period A1 when a first start signal 26 is switched from the first state to the second state, and the vehicle start is turned off at a time point or a period A2 when the first start signal 26 is switched from the second state to the first state. This applies equally to a period B1 in which a second start signal 27 is switched from the first state to the second state and the period B2 in which the second start signal 27 is switched from the second state to the first state.

Meanwhile, similar to as described above with reference to FIG. 5, the on/off determination unit 130 may determine the system-on state when the start signal is switched from the first state to the second state in the system-off state.

For example, the on/off determination unit 130 determines from the system-off to the system-on at a time point or period A1 when the first start signal 26 is switched from the first state to the second state.

After the system-on is determined, the on/off determination unit 130 may maintain the system-on state even if the start signal, which is a non-pulse signal, is switched from the first state to the second state.

For example, after the time point or period A2 at which the first start signal 26 is switched from the second state to the first state, even if the second start signal 27 is switched from the first state to the second state (B1) again, the on/off determination unit 130 maintains the system-on state.

Meanwhile, even when the start signal is a non-pulse signal, it is necessary to check whether the controller 32 is in a state in which a function can be normally performed similarly to that described above with reference to FIGS. 7 and 8.

Figure 12:
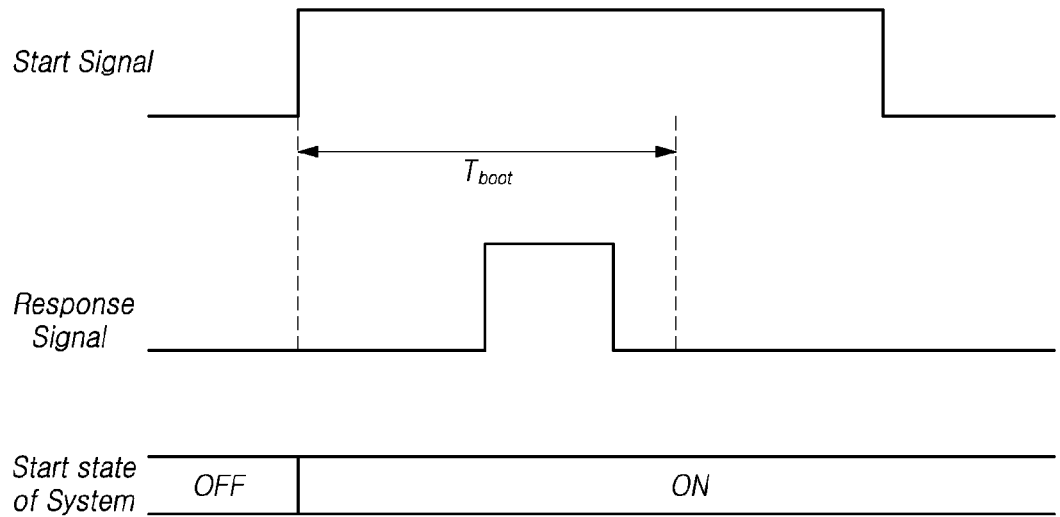
FIGS. 12 and 13 are diagrams illustrating a second embodiment in which the first power supply device determines system-on in the case that the start signal is a non-pulse signal.
Figure 13:
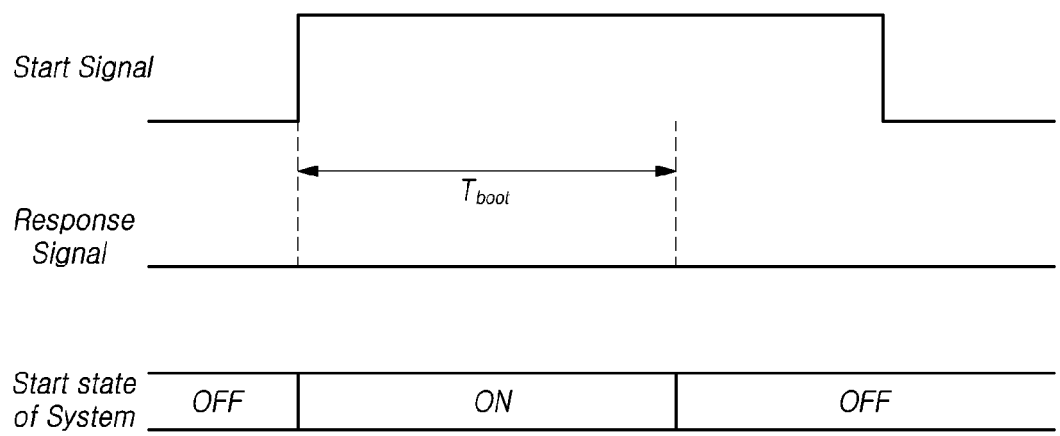

FIGS. 12 and 13 are diagrams illustrating a second embodiment in which the first power supply device 100 determines system-on in the case that the start signal is a non-pulse signal.

Referring to FIGS. 12 and 13, the on/off determination unit 130 may determine whether of the system-on based on whether the start signal is switched from the first state to the second state in the system-off state, and whether a response signal is received at a booting response time $T_{boot}$ after the start signal is switched from the first state to the second state.

Here, the booting response time $T_{boot}$ may preferably proceed from a section in which the start signal is switched from the first state to the second state.

As shown in FIG. 12, the on/off determining unit 130 may determine the system-on when the start signal is switched, and may maintain the system-on if a response signal is received within the booting response time $T_{boot}$ from a switching time of the start signal.

As shown in FIG. 13, if the response signal is not received, the on/off determination unit 130 may determine from the system-on to the system-off when the booting response time $T_{boot}$ elapses.

Meanwhile, even when the start signal is a non-pulse signal, it is required for the system 30 to be determined to the system-off.

Figure 14:
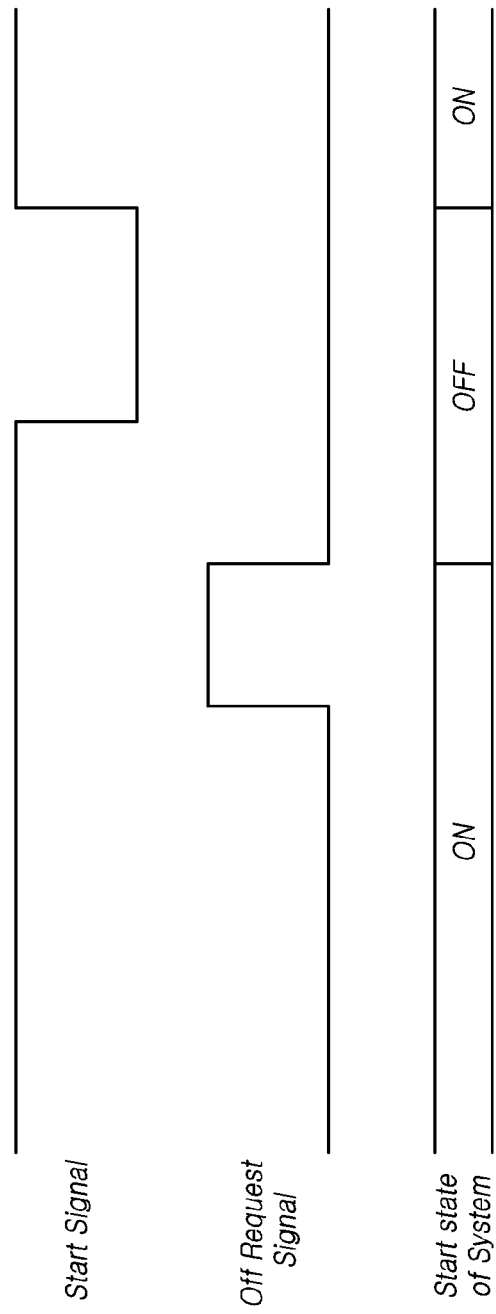
FIGS. 14 and 15 are diagrams illustrating a first embodiment in which the first power supply device determines the system-off in the case that the start signal is a non-pulse signal.
Figure 15:
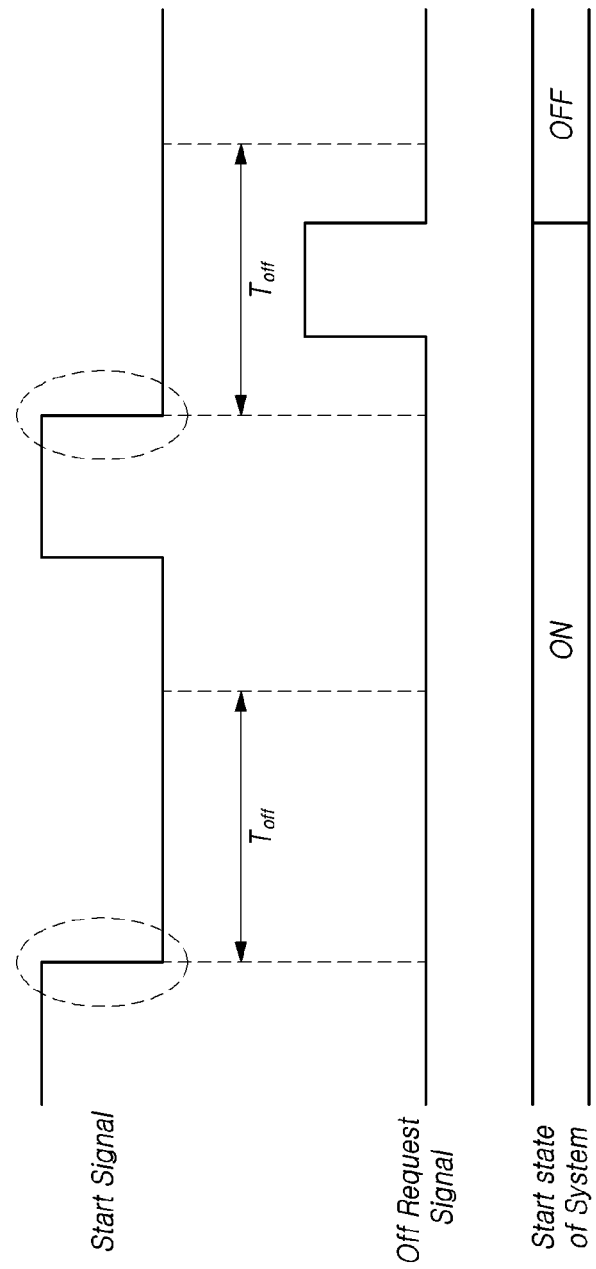

FIGS. 14 and 15 are diagrams illustrating a first embodiment in which the first power supply device 100 determines the system-off in the case that the start signal is a non-pulse signal.

Referring to FIGS. 14 and 15, the on/off determination unit 130 may determine the system-off based on whether an off request signal is received from the controller 32 as described above with reference to FIG. 9.

Here, as shown in FIG. 14, the off request signal may be received if the system 30 is the system-on state and the start signal is in the second state. In this case, the on/off determination unit 130 may determine from the system-on to the system-off when the reception of the off request signal is finished.

Meanwhile, the on/off determination unit 130 may additionally recognize whether the start signal is switched from the second state to the first state, and may determine the system-off based on whether the off request signal is received within a preset off response time $T_{off}$ from the time when the start signal is switched.

Specifically, the on/off determination unit 130 may determines from the system-on to the system-off based on whether the start signal is switched from the second state to the first state in the system-on state, and whether an off request signal is received at a preset off response time $T_{off}$ after the start signal is switched from the second state to the first state.

Here, the off response time $T_{off}$ may mean a time set to determine whether the system 30 also needs to be turned off as needed when the vehicle start is turned off. The off response time $T_{off}$ may be set by a design process, or may be adjusted through internal communication with the controller 32.

Referring to FIG. 15, for example, if the off request signal is not received within the off response time $T_{off}$ from when the start signal is switched from the second state to the first state, the on/off determination unit 130 maintains the system-on. Alternatively, if the off request signal is received, the on/off determination unit 130 determines from the system-on to the system-off.

Here, the time point at which it is determined from the system-on to the system-off only needs to be after the off response time $T_{off}$. The above-described time point may be preferably when the off response time $T_{off}$ has elapsed.

Figure 16:
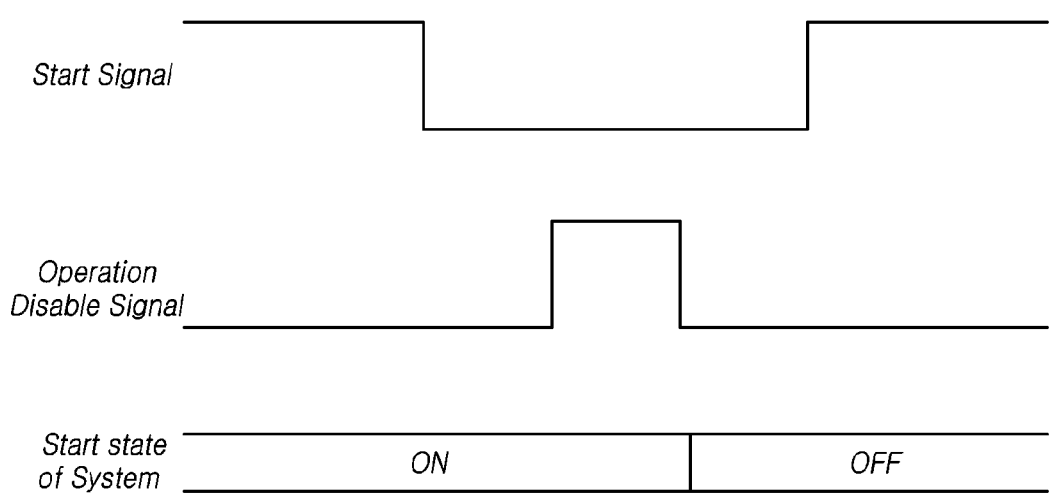
FIGS. 16 and 17 are diagrams illustrating a second embodiment in which the first power supply device determines system-off in the case that the start signal is a non-pulse signal.
Figure 17:
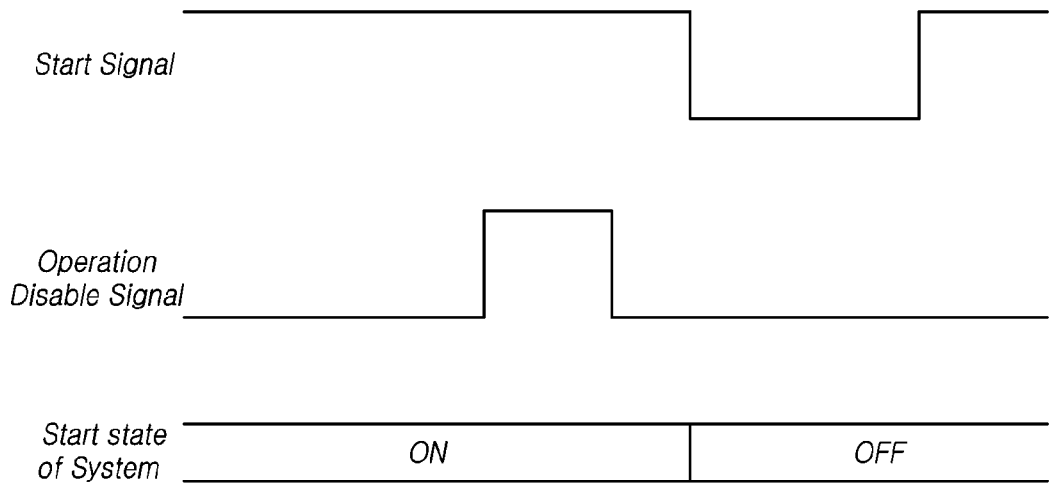

FIGS. 16 and 17 are diagrams illustrating a second embodiment in which the first power supply device 100 determines system-off in the case that the start signal is a non-pulse signal.

Referring to FIGS. 16 and 17, the on/off determination unit 130 may determine the system-off by checking whether an operation disable signal is received as described above with reference to FIG. 10.

In this case, the time point when determined from the system-on to the system-off may be a time when the reception of the operation disable signal is finished, as shown in FIG. 16, or may be a time point at which the start signal is switched from the second state to the first state, as shown in FIG. 17. However, the present invention is not limited thereto, and it may be delayed longer than the time points shown in FIGS. 16 and 17 according to a design process, driving conditions, and internal communication with the controller 32.

As described above, the first power supply device 100 according to the present disclosure may provide the effect of reducing the size of the system 30 by replacing the physical switching element, structure, and circuit with logic such as signal state change.

Hereinafter, it will be described a power supply device of the system 30 which operates depending on the start state of the vehicle in detail.

Figure 18:
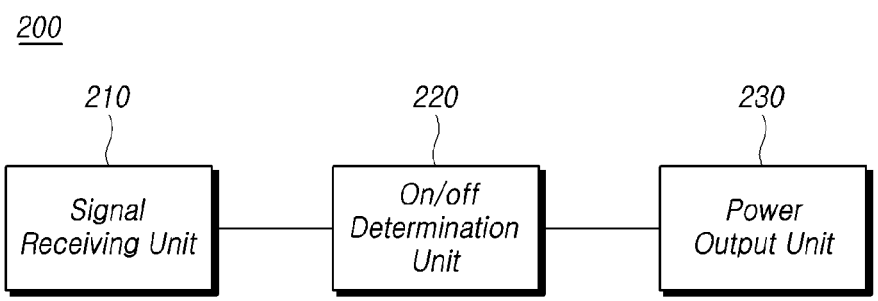
FIG. 18 is a block diagram for explaining a second power supply device according to the present disclosure.

FIG. 18 is a block diagram for explaining a second power supply device 200 according to the present disclosure.

Referring to FIG. 18, the second power supply device 200 according to the present disclosure may include a signal receiving unit 210, an on/off determination unit 220, and a power output unit 230.

Since the signal receiving unit 210 and the power output unit 230 are the same as described above with reference to FIG. 3, it will be omitted the description of the signal receiving unit 210 and the power outputting unit 230.

The on/off determination unit 220 may determine a start state of a system 30 based on a change in the state of a start signal when the start signal is received.

Here, the start signal may be a pulse signal or a non-pulse signal, as described above with reference to FIG. 4.

Meanwhile, the on/off determination unit 220 may classify a type of the start signal as described above with reference to FIG. 4. That is, the on/off determination unit 220 may measure a maintenance period during which the state of the start signal is maintained in a specific state, compare the maintenance period with the reference period, and classify the start signal into a non-pulse signal or a pulse signal according to the comparison result.

Hereinafter, a method for the on/off determination unit 220 to determine the start state of the system 30 will be described for each start signal.

Figure 19:
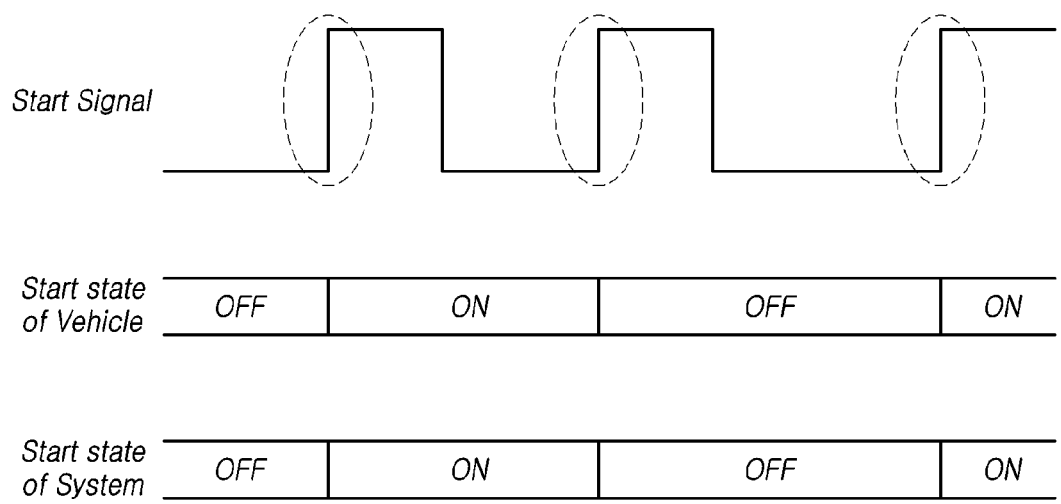
FIG. 19 is a diagram illustrating an embodiment in which the second power supply device determines a start state of the system in the case that the start signal is a pulse signal.

FIG. 19 is a diagram illustrating an embodiment in which the second power supply device 200 determines a start state of the system 30 in the case that the start signal is a pulse signal.

Referring to FIG. 19, the on/off determination unit 220 may determine the system-on or the system-off based on whether the start signal is switched from the first state to the second state and a pulse width similar to that described above with reference to FIGS. 5 and 6.

For example, the on/off determination unit 220 determines the system-on if the start signal is switched from the first state to the second state in the system-off state, and a pulse width corresponding to the period in which the second state is maintained is greater than or equal to the preset reference width.

As another example, the on/off determination unit 220 determines the system-off if the start signal is switched from the first state to the second state in the system-on state, and a pulse width corresponding to the period in which the second state is maintained is greater than or equal to the preset reference width.

FIG. 20 is a diagram illustrating an embodiment in which the second power supply device 200 determines a start state of the system 30 in the case that the start signal is a non-pulse signal.

Referring to FIG. 20, the on/off determination unit 220 may determines the system-on if the start signal is switched from the first state to the second state, and may determine the system-off if the start signal is switched from the second state to the first state.

For example, the on/off determination unit 220 determines the system-on from the system-off at a time point or period A1 when a first start signal 28 is switched from a first state to a second state, and determines the system-off from the system-on at a time point or period A2 when the first start signal 28 is switched from the second first state to the first state. In addition, the on/off determination unit determines the state of the system 30 in the same manner in the state change periods B1 and B2 of the second start signal 29.

As described above, according to the present disclosure, the present disclosure may provide a power supply device capable of miniaturizing a system by performing logic instead of a switching element.

In addition, according to the present disclosure, the present disclosure may provide a power supply device capable of maximizing vehicle safety by continuously operating the system even if the vehicle ignition or start is turned off after determining the system-on.

The above description and attached drawings have been presented to enable any person skilled in the art to make and use the technical idea of the present disclosure, and have been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A power supply device of a vehicle-related system capable of operating even when a vehicle start is turned off, the power supply device comprising an integrated chip, wherein the integrated chip is configured to:
   receive power from a battery module of a vehicle and supply driving power to a controller in the vehicle-related system,
   receive a start signal of the vehicle;
   perform internal communication with the controller of the vehicle-related system via a bus between the power supply device and the controller;
   determine a start state of the vehicle-related system based on at least one of a state change of the received start signal and whether of receiving a communication signal output from the controller of the vehicle-related system; and
   supply power in case of a system-on, and stop the supply of the power in case of a system-off,
   wherein the start signal is a pulse signal, wherein the pulse signal is generated in response to pressing of a start button or an ignition button, and
   wherein the start signal is the pulse signal, which is generated in response to pressing the start button or the ignition button, having a pulse width of a period during which a second state is maintained, and the integrated chip compares the pulse width with a preset reference width and determines whether of the system-on according to the comparison result.

2. The power supply device of claim 1, wherein the integrated chip determines that the vehicle-related system is the system-on in response to the pulse width being greater than or equal to the reference width, and maintains the system-off in response to the pulse width being less than the reference width.

3. The power supply device of claim 2, wherein the integrated chip maintains the system-on state even if the start signal is received after the system-on is determined.

4. The power supply device of claim 1, wherein the integrated chip further determines whether of the system-on based on whether the start signal is switched from a first state to a second state in a system-off state and whether of receiving a response signal output from the controller at a preset booting response time after the start signal is switched from the first state to the second state.

5. The power supply device of claim 4, wherein the integrated chip determines from the system-off to the system-on in response to the start signal being switched from the first state to the second state, and, in response to the response signal being not received in a state of the system-on, determines from the system-on to the system-off after the booting response time elapses.

6. The power supply device of claim 1, wherein the integrated chip further determines from the system-on to the system-off in response to an off request signal output from the controller being received in a state of the system-on.

7. The power supply device of claim 6, wherein the start signal is a non-pulse signal generated in response to pressing the start button or the ignition button, and the integrated chip determines from the system-on to the system-off based on whether the start signal is switched from the second state to the first state in a system-on state and whether of receiving the off request signal at a preset off response time after the start signal is switched from the second state to the first state.

8. The power supply device of claim 7, wherein the integrated chip determines from the system-on to the system-off in response to the off request signal being received within the off response time from when the start signal is switched from the second state to the first state, and maintains the system-on in response to the off request signal being not received.

9. The power supply device of claim 1, wherein the integrated chip further checks whether an operation disable signal output by the controller is received in a state of the system-on,
   wherein the integrated chip determines from the system-on to the system-off in response to the operation disable signal being received, and maintains the system-off even in response to the start signal being received after the system-off is determined.

* * * * *